(12) United States Patent
Anubolu et al.

(10) Patent No.: US 7,433,366 B1
(45) Date of Patent: Oct. 7, 2008

(54) OFFERED LOAD FAIRNESS IN A STACK

(75) Inventors: Surendra Anubolu, Fremont, CA (US); James P. Rivers, Saratoga, CA (US); Stewart Findlater, Mountain View, CA (US); David Hsi-Chen Yen, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 962 days.

(21) Appl. No.: 10/439,564

(22) Filed: May 16, 2003

(51) Int. Cl.
*H04L 12/413* (2006.01)
*H04L 12/43* (2006.01)
*H04L 12/28* (2006.01)
*H04J 3/02* (2006.01)

(52) U.S. Cl. .................. 370/448; 370/461; 370/462

(58) Field of Classification Search .................. 712/202, 712/214; 370/395.53, 445, 447–448, 461–462; 710/110
See application file for complete search history.

(56) References Cited

U.S. PATENT DOCUMENTS

| | | | | |
|---|---|---|---|---|
| 5,146,454 A | * | 9/1992 | Courtois et al. ............. | 370/231 |
| 5,706,281 A | * | 1/1998 | Hashimoto et al. .......... | 370/252 |
| 5,764,392 A | * | 6/1998 | Van As et al. ................. | 398/79 |
| 5,946,324 A | * | 8/1999 | Mishra et al. ................. | 370/468 |
| 6,078,591 A | * | 6/2000 | Kalkunte et al. ............. | 370/448 |
| 6,504,824 B1 | * | 1/2003 | Tanaka et al. ................. | 370/252 |
| 6,532,507 B1 | * | 3/2003 | Falik et al. .................... | 710/107 |
| 6,545,983 B2 | * | 4/2003 | Belaiche ....................... | 370/252 |
| 6,697,369 B1 | * | 2/2004 | Dziong et al. ............. | 370/395.2 |
| 6,898,564 B1 | * | 5/2005 | Odhner et al. ................. | 703/21 |
| 6,928,069 B2 | * | 8/2005 | Nakanishi ..................... | 370/352 |
| 6,965,933 B2 | * | 11/2005 | Haartsen ...................... | 709/223 |
| 7,006,520 B1 | * | 2/2006 | Hann et al. ................... | 370/461 |
| 2003/0084088 A1 | * | 5/2003 | Shaffer ......................... | 709/104 |
| 2003/0219028 A1 | * | 11/2003 | Peyravian et al. ............. | 370/439 |

OTHER PUBLICATIONS

CISCO Systems, Inc., *Internetworking Technologies Handbook*, Chapter 8, "Fiber Distributed Data Interface", retrieved from the Internet: <URL:http://www.cisco.com/univercd/cc/td/doc/cisintwk/ito_doc/fddi.htm#xtocid2>.

CISCO Systems, Inc., *Internetworking Technologies Handbook*, Chapter 8, "Fiber Distributed Data Interface", retrieved from the Internet: <URL:http://www.cisco.com/univercd/cc/td/doc/cisintwk/ito_doc/fddi.htm#xtocid2>, Dec. 2000.

* cited by examiner

*Primary Examiner*—Seema S. Rao
*Assistant Examiner*—Xavier Szewai Wong
(74) *Attorney, Agent, or Firm*—Charles E. Krueger

(57) ABSTRACT

A technique for allocating stack bus bandwidth based on the offered load of each stack member coupled to the stacking bus allocates access opportunities to the stack bus based on the ratio of the offered loads of the coupled stack members.

10 Claims, 3 Drawing Sheets

OFFERED LOAD FAIRNESS IN A STACK

BACKGROUND OF THE INVENTION

In the lower end ethernet switch market, fixed configuration switches are widely used. Customers want the level of upgradability with these fixed configuration switches that has been previously achievable in chassis based configuration.

Seamless integration and upgradeability are achieved in Fixed Configuration switches with a Stack Port coupled to a Stack Bus, which is typically implemented as a ring for redundancy. In a chassis configuration, an arbiter can be centralized making it easy to enforce fair access for the line cards connecting to the switch fabric.

However, in a stackable system all the stack members on the stack may not have the same number of ports or bandwidth requirement. The number of ports or bandwidth requirement of a particular stack member in a stack is the load offered to the stacking bus.

It is highly desirable to have the stack bandwidth allocated in proportion to the offered load. As an example, a 48 port 100 Mbs stack member should get twice the share of stack bandwidth compared to 24 port 100 Mbs stack member. Stack members need a distributed system for insuring fair access to the stacking bus based on the offered load.

Shared ethernet allocates stack bandwidth using CSMA/CD, but the backoff time reduces the media utilization with a large number of nodes contending for the access.

FDDI allocates stack bandwidth by giving equal access to all the switches sharing the medium. This is a significant improvement over ethernet but this does not allocate the access opportunity in the ratio of the offered load.

BRIEF SUMMARY OF THE INVENTION

According to one embodiment of the invention, a dynamic method is provided for insuring fair access to the stack bandwidth in proportion to the offered load.

According to another embodiment of the invention, a static method is provided for insuring fair access to the stack bandwidth in proportion to the offered load.

According to another embodiment of the invention, each stack member has the capability of skipping access opportunities to the stack bus. A stack member having only 1 out of N access opportunities will get 1/Nth of the stack bandwidth as that of a stack member that uses every access opportunity.

According to another embodiment of the invention, the static offered load is based on the sum of all port speeds of a stack member.

According to another embodiment of the invention, the dynamic offered load is based on the actual amount of data received during a predetermined time period.

According to another embodiment of the invention, a threshold value is calculated that indicates the ratio of the offered load of a current stack member to the maximum offered load of any stack member included in the stack. The frequency of skipping access opportunities is determined by the threshold value.

According to another embodiment of the invention, each stack member has an access opportunity when a token is passed to the stack member. A field in the token is used to pass offered load information of each stack member to other stack members in the stack.

In another embodiment of the invention, the threshold is normalized utilizing the threshold of the stack member in the stack having the greatest offered load.

Other features and advantages of the invention will be apparent in view of the following detailed description and appended drawings.

DETAILED DESCRIPTION OF THE INVENTION

Reference will now be made in detail to various embodiments of the invention. Examples of the these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

The invention will now be described with reference to various embodiments implemented in a stack member. In the following, the term stack member is utilized broadly to include any component such a router, bridge, switch, layer 2 or layer 3 switch, gateway, etc., that refers to components utilized to implement connectivity within a network or between networks.

Figure 1:
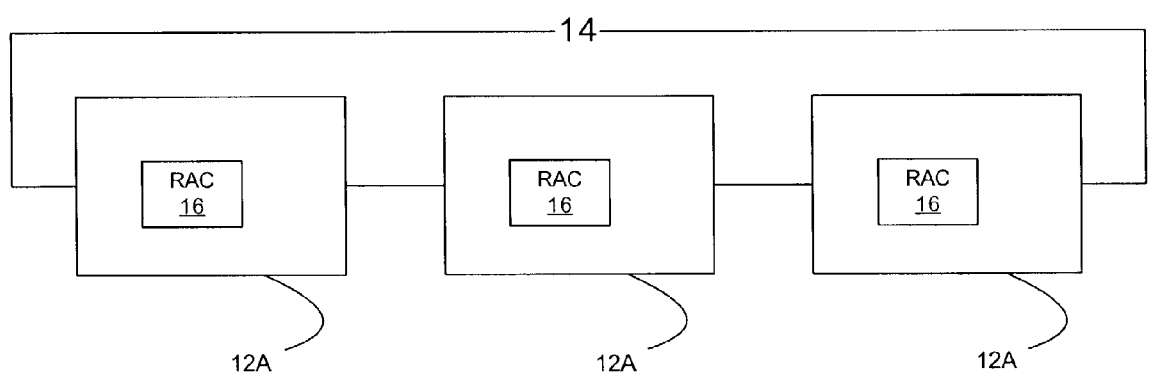
FIG. 1 is a block diagram of a set of stack members connected by a stack bus.

FIG. 1 depicts a system in which an embodiment of the invention can be utilized. In this example the stack members in the stack are set of port ASICs 12 connected by a stack bus in the form of a fiber optic 14 ring to form a stack. The control of the stack is distributed among the port ASICs and each port ASIC includes a ring access controller (RAC) 16. Each port ASIC includes a Receive Buffer (not shown) that holds data to be placed on the ring 14. The port ASICs may have a variable number of ports configured to operate at different data rates.

In this embodiment access to the ring is controlled by passing a token between the port ASICs 12 in the stack. Each port ASIC 12 which is part of a stack may be differently configured in terms of the number of ports and data rates of the ports included on the port ASIC 12 thereby offering different loads to the ring.

As each port ASIC 12 receives packets that are to be transmitted by other port ASICs the received packets are stored in the receive buffer. When a RAC 16 on a particular port ASIC 12 sees a token coming around, the RAC signals an access opportunity to the Receive Buffer.

Figure 2:
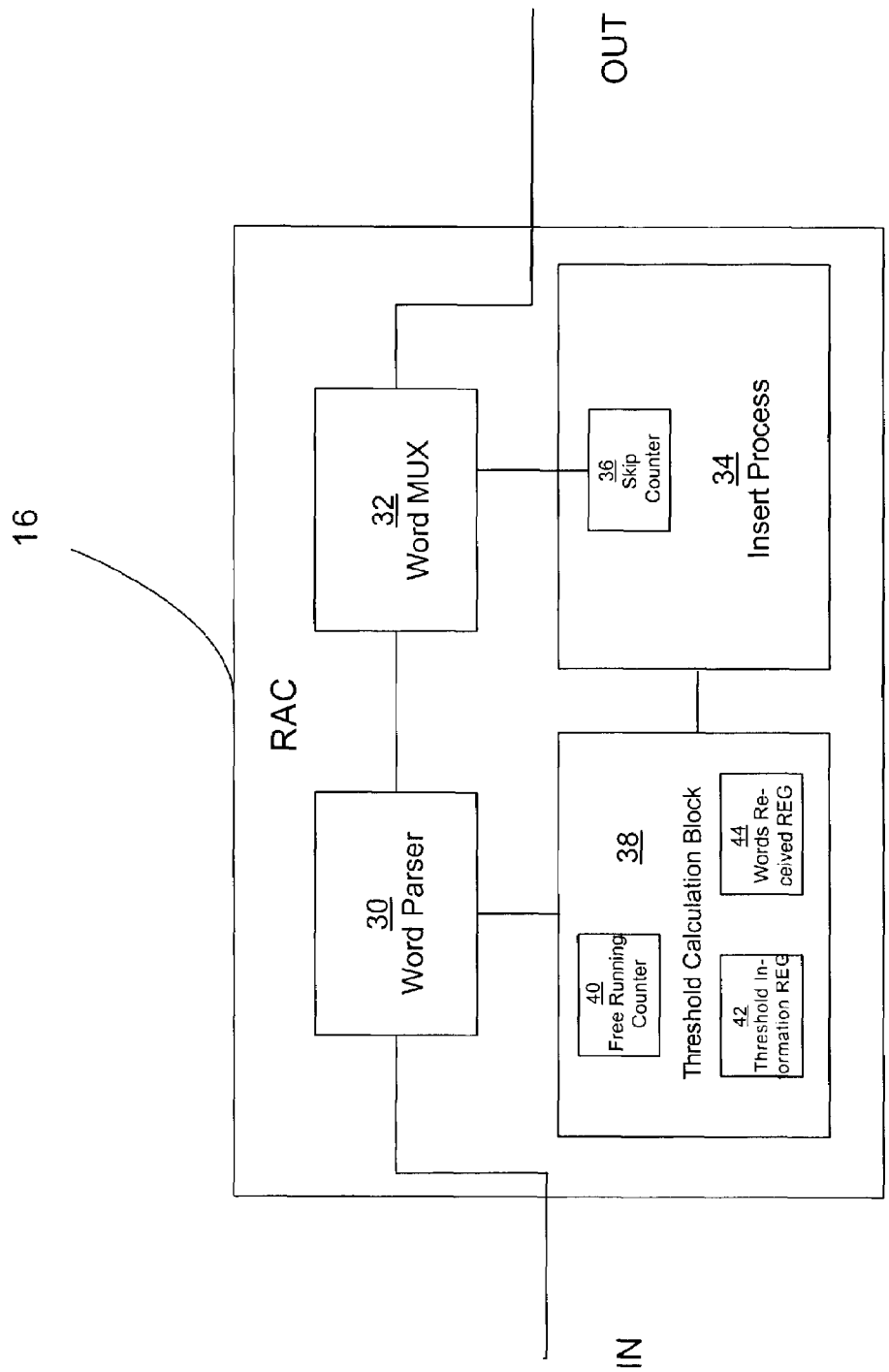
FIG. 2 is a block diagram of a ring access controller that implements an embodiment of the invention.

FIG. 2 is a block diagram of a RAC 16. Each RAC is connected to a fiber input and a fiber output. The fiber input is coupled to the fiber output via a word parser 30 and word mux 32. An insert block 34 includes a skip counter 36 and a threshold calculation block 38 includes a free running counter 40 and register set including a threshold information register 42 and a words received register 44.

To ensure offered load access fairness among the port ASICs sharing the ring, a thresholding mechanism is implemented. It works by having port ASICs with low offered load skip access opportunities (tokens) a few times before using one. As an example, a threshold of 10 would mean a RAC will use at most 1 out of 10 access opportunities. The receive data path provides a threshold number to it's RACs based on a reciprocal relationship to its offered load.

In the following two different techniques for determining the offered load of each stack member in a stack will be described. The first is a static method and the second is a dynamic method.

Turning first to the static method. During initialization the RACs 16 on all the port ASICs 12 included in the stack will exchange data to find the RAC with highest offered load. Offered load in the static method is the sum of port speeds of a port ASIC. Each RAC has a Static Threshold that determines the number of times an access opportunity will be skipped before it is taken. So if a RAC threshold is n then only 1 out of n access opportunities are used. The value of the skip counter 36 of a RAC is inversely proportional to the ratio of offered load on the stack member to the maximum offered load of any stack member on the stack. Thus, in this embodiment the greater the offered load the lower the threshold value.

Turning next to the dynamic method, the following is an overview of the method. The RAC on each port ASIC in the stack keeps track of the current offered load (bytes received from all the ports and written to buffer in the last x microseconds, where x is a programmable averaging period). This information is exchanged with other RACs through the token to arrive at the maximum of the offered loads seen by the RACs sharing the stack. Each stack member will skip the ring access inversely proportional to the ratio of the current offered load on the stack member and the maximum offered load on any stack member on the stack.

The following is a more detailed description of the methods. As described above, each RAC includes a threshold information register 42 that holds: 1) a threshold type select field indicating whether the static or dynamic method is being used; 2) a maximum bandwidth field indicating the highest bandwidth of any port ASIC included in the stack; 3) the dynamic bandwidth currently being used by the RAC; and, 4) the static threshold.

This threshold information register 42 controls how the RAC threshold is calculated. This threshold is used to control the access fairness between different RACs on the same ring. This threshold value is then normalized by the RAC and this normalized threshold defines how many access opportunities to skip. In this embodiment, a threshold of one indicates that every access opportunity should be used, while a threshold of four means that every fourth access opportunity will be used.

If the static threshold is used then the Static Threshold field is programmed to a value that defines the relative weight of this RAC with respect to other RACs in the system and set threshold Type Select field to indicate that the static method is being used. If all the RACs are programmed to the same value then all of them will get equal access opportunity (effectively disabling the access fairness feature).

Figure 3:
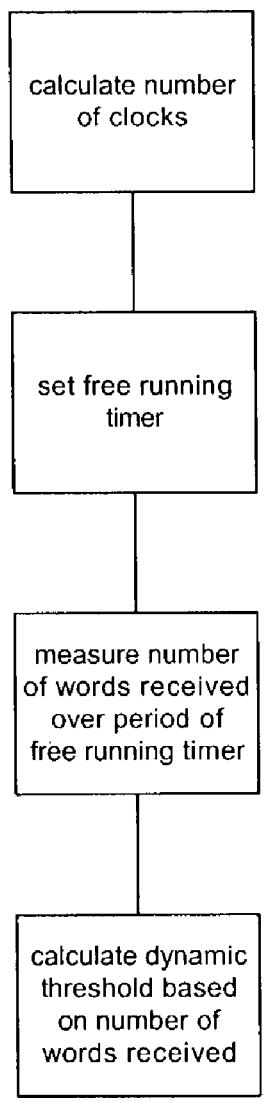
FIG. 3 is a flow chart depicting the steps for computing a dynamic threshold value.

The steps for calculating the dynamic threshold will now be described with reference to the flow chart of FIG. 3. If the dynamic threshold is used the threshold Type Select field is programmed to indicate that the dynamic method is being used and the maximum bandwidth field is programmed to equal the bandwidth in Gbps of the highest bandwidth port ASIC in the stack. The value in this field determines the size (in bits) of a free running timer and is calculated by determining the "number of clocks" to fill the receive buffer as if data were being received at the maximum rate. This number of clocks is determined by dividing highest bandwidth by the maximum rate that data is received.

The maximum rate is equal to the bandwidth measured in Gbs of the port ASIC having the maximum bandwidth. This number of clocks is utilized to determine the size of the free running timer 40 included in the threshold calculation unit 38 of the RAC.

To calculate the dynamic threshold for a particular port ASIC the words received register 44 is incremented each time a word is received at the particular port ASIC and the contents of the words received register is read and then cleared each time the free running timer 40 equals all zeros, which defines the programmable averaging time.

Finally, the dynamic threshold is set equal to (maximum words expected)/(words received). In one embodiment the $\log_2$ of the various values are stored in registers so that the number of clocks and dynamic threshold can be determined by subtraction and so that the use of dividers is avoided. The maximum words expected is equal to the size of the receive buffer and the words received is equal to the value of the words received register read when the free running counter is equal to all zeros. Thus, the dynamic threshold reflects the offered load of the particular port ASIC averaged over the size of the free running timer. The dynamic threshold is loaded into the skip counter 36

As described above, the threshold on each port ASIC is normalized to the other port ASICs in the stack to prevent inefficient utilization of the stack bus. For example, if the threshold of all port ASICs in the stack were four then each port ASIC would have the same offered load but would only accessing the ring every fourth access opportunity which would be highly inefficient. In this case, each threshold value would be normalized to one so that each port ASIC would access the ring each time it had an opportunity. A second example is a stack having first, second, and third port ASICs having thresholds of two, four, and four respectively. In this case, the thresholds would be normalized to one, two, and two respectively for efficient use of the ring.

Figure 4:
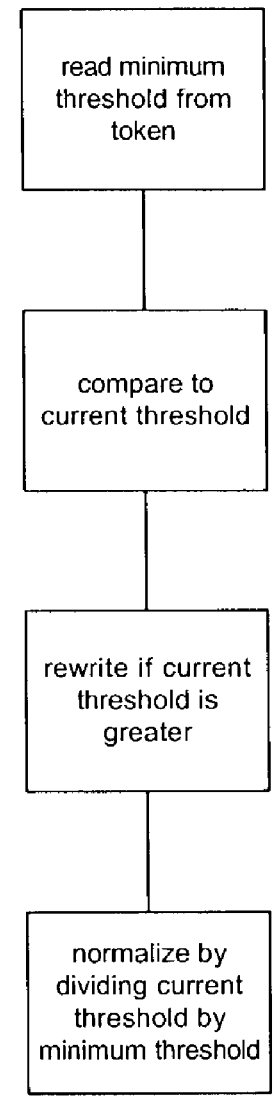
FIG. 4 is a flow chart depicting the steps for normalizing the threshold value.

This normalization is achieved through the use of a minimum threshold field in the token. As depicted in the flow chart of FIG. 4, as the token is passed to each port ASIC in the stack the threshold calculation unit 38 of the RAC reads the minimum threshold field in the token and compares the value of the minimum threshold field to the value of its own threshold. If its own threshold is lower than the value of the read minimum threshold field then the RAC rewrites the minimum threshold field with its own threshold value otherwise it does not modify the minimum threshold value. It then normalizes its threshold value by dividing the threshold value by the minimum threshold value and loads the normalized threshold value into the skip counter 36.

Accordingly, a technique that provides fair access to each stack member independent of its location on the stack has been described. Unlike FDDI, the access is prioritized according to the load offered by the stack member to the stack bus. The technique has minimal effect on the efficiency of the stack bus and is easy to configure. Further, it provides dynamic adaptation to changing traffic loads using the dynamic threshold technique.

The invention may be implemented as program code, stored on a computer readable medium, that is executed by a digital computer. The computer readable medium may include, among other things, magnetic media, optical media, electro-magnetic fields encoding digital information, and so on.

The invention has now been described with reference to the preferred embodiments. Alternatives and substitutions will now be apparent to persons of skill in the art. In particular, in the in the described embodiment a stacking bus in the form of a ring has been described. However, the invention can be implemented utilizing other stacking buses known in the art. Further, different techniques for calculating the threshold value and implementing access opportunity skipping can be implemented as is known in the art. Accordingly, it is not intended to limit the invention except as provided by the appended claims.

What is claimed is:

1. A method comprising:

passing a token among a plurality of stack members in a stack, with each stack member having one or more ports, with the stack members coupled by a stacking bus, and with each stack member granted a bus access opportunity when in possession of the token;

setting an offered load value at each stack member equal to a sum of the port speeds of each port on the stack member;

exchanging offered load values among stack members in the stack to determine a maximum offered load value of the offered loads of the stack members in the stack;

loading a threshold value into a skip counter included in a first stack member to indicate the ratio of the offered load of the first stack member to the maximum offered load value;

and skipping access opportunities to the stacking bus at the first stack member when the first stack member is in possession of the token at a frequency that is inversely proportional to the threshold value loaded into the skip counter.

2. The method of claim 1 further comprising:

reading a minimum threshold value from a minimum threshold value field in the token and rewriting the threshold value at the first stack member if the threshold value of the first stack member is greater than the minimum threshold value read from the minimum threshold value field.

3. A method comprising:

passing a token among a plurality of stack members in a stack, with each stack member having one or more ports, with the stack members coupled by a stacking bus, and with each stack member granted a bus access opportunity when in possession of the token;

exchanging information among the stack members in the stack to determine a maximum bandwidth rate value of the bandwidth rate values of the stack members, where the bandwidth rate value is the sum of the port speeds of a stack member;

determining, at a first stack member, a programmable timing interval equal to the time required to fill a receive buffer at the first stack member at the maximum bandwidth rate value;

determining a current offered load value at the first stack member equal to the number of words received at the first stack member during the programmable timing interval;

calculating the ratio of the receive buffer size at the first stack member to the current offered load value to determine a dynamic threshold value for the first stack member;

loading the dynamic threshold value into a skip counter included in the first stack member; and skipping a number of access opportunities to the stacking bus at the first stack member when in possession of a token in proportion to the dynamic threshold value loaded into the skip counter to share access to the stacking bus according to the dynamic threshold value.

4. The method of claim 3 further comprising:

reading a minimum threshold value from a minimum threshold value field in the token at the first stack member and rewriting the dynamic threshold value if the dynamic threshold value of the stack member is greater than the minimum threshold value read from the minimum threshold value field.

5. A system comprising:

an access controller, included in a first stack member and adapted to be coupled to a stacking bus, with the stacking bus adapted to be coupled to a plurality of stack members in a stack and to pass a token that grants bus access opportunities to the stack member having possession of the token, with the access controller adapted to insert frames onto the stacking bus when an access opportunity occurs;

a first storage element, readable by the access controller, with the first storage element adapted to hold a threshold value indicating a ratio of the load offered by the first stack member coupled to the stacking bus relative to a maximum offered load offered by other stacking members coupled to the stacking bus, where the offered load is the sum of port speeds of a stacking member; and with the access controller skipping access opportunities to the stacking bus when the first stack member is in possession of the token at a frequency that is inversely proportional to the threshold value held in the first storage element.

6. The system of claim 5 further comprising:

a words received register;

a counter;

with the access controller configured to set the counter to a maximum words received value so that the counter defines a measurement period required to receive the maximum number of words, to load the words received register with an offered load value equal to a measured value of the actual amount of data received at the first stack member from all ports during the measurement period, to exchange offered load values with each stack member in the stack to determine a largest value of offered load of any stack member in the stack, and to set the threshold value in the first storage element to indicate the ratio of the offered load of the current stack member to the maximum offered load.

7. A system comprising:

means for passing a token among a plurality of stack members in a stack, with each stack member having one or more ports, with the stack members coupled by a stacking bus, and with each stack member granted a bus access opportunity when in possession of the token;

means for setting an offered load value at each stack member equal to the sum of the port speeds of each port on the stack member;

means for exchanging offered load values among stack members in the stack to determine a maximum offered load value of the offered loads of the stack members in the stack;

means for loading a threshold value into a skip counter included in a first stack member to indicate the ratio of the offered load of the first stack member to the maximum offered load value;

and means for skipping access opportunities to the stacking bus at the first stack member when the first stack member is in possession of the token at a frequency that is inversely proportional to the threshold value loaded into the skip counter.

8. The system of claim 7 where the means for exchanging load values further comprises:
- means for reading a maximum offered load value from a maximum offered load field in the token and rewriting the maximum offered load value at the first stack member if the offered load value of the first stack member is greater than the offered load value read from the maximum offered load field.

9. A system comprising:
- means for passing a token among a plurality of stack members in a stack, with each stack member having one or more ports, with the stack members coupled by a stacking bus, and with each stack member granted a bus access opportunity when in possession of the token;
- means for exchanging information between the stack members in the stack to determine a maximum bandwidth rate value of the bandwidth rate values of the stack members, where the bandwidth rate value is a sum of the port speeds of a stack member;
- means for determining, at a first stack member, a programmable timing interval equal to the time required to fill a receive buffer at the first stack member at the maximum bandwidth rate value;
- means for determining a current offered load value at the first stack member equal to the number of words received at the first stack member during the programmable timing interval;
- means for calculating the ratio of the receive buffer size at the first stack member to the current offered load value to determine a dynamic threshold value for the first stack member;
- means for loading the dynamic threshold into a skip counter; and
- means for skipping a number of access opportunities to the stacking bus at the first stack member when the first stack member is in possession of the token in proportion to the dynamic threshold value loaded into the skip counter to share access to the stacking bus according to the dynamic threshold value.

10. The system of claim 9 where means for exchanging information further comprises:
- means for reading a maximum bandwidth rate value from a maximum bandwidth rate field in the token and rewriting the maximum bandwidth rate value if the bandwidth rate value of the stack member is greater than the maximum bandwidth rate value read from the maximum bandwidth rate field.

* * * * *